Figure 1:
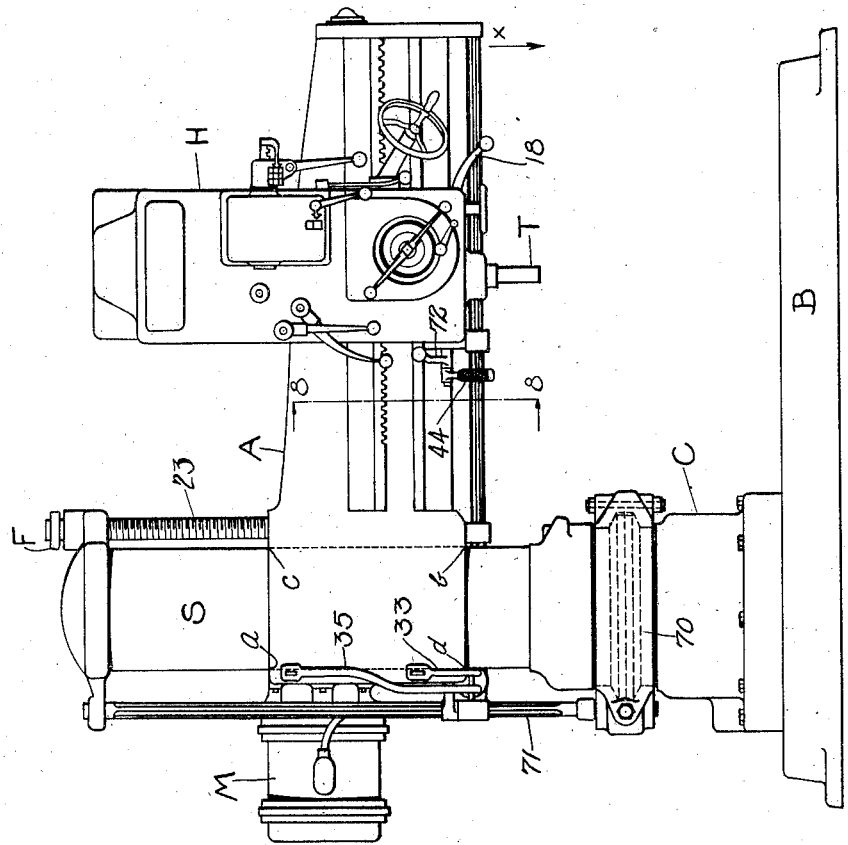

Feb. 27, 1934.  D. C. KLAUSMEYER ET AL  1,948,618
INTERLOCKED ARM CLAMP AND ELEVATING CONTROL
Filed April 4, 1930    6 Sheets-Sheet 1

Inventors
DAVID C. KLAUSMEYER
  DECEASED
BY
Attorneys H. HENRY SUNDERMANN
  EXECUTOR
By
Nathan Bowman   AUGUSTUS M. SOSA Feb. 27, 1934.  D. C. KLAUSMEYER ET AL  1,948,618
INTERLOCKED ARM CLAMP AND ELEVATING CONTROL
Filed April 4, 1930   6 Sheets-Sheet 3
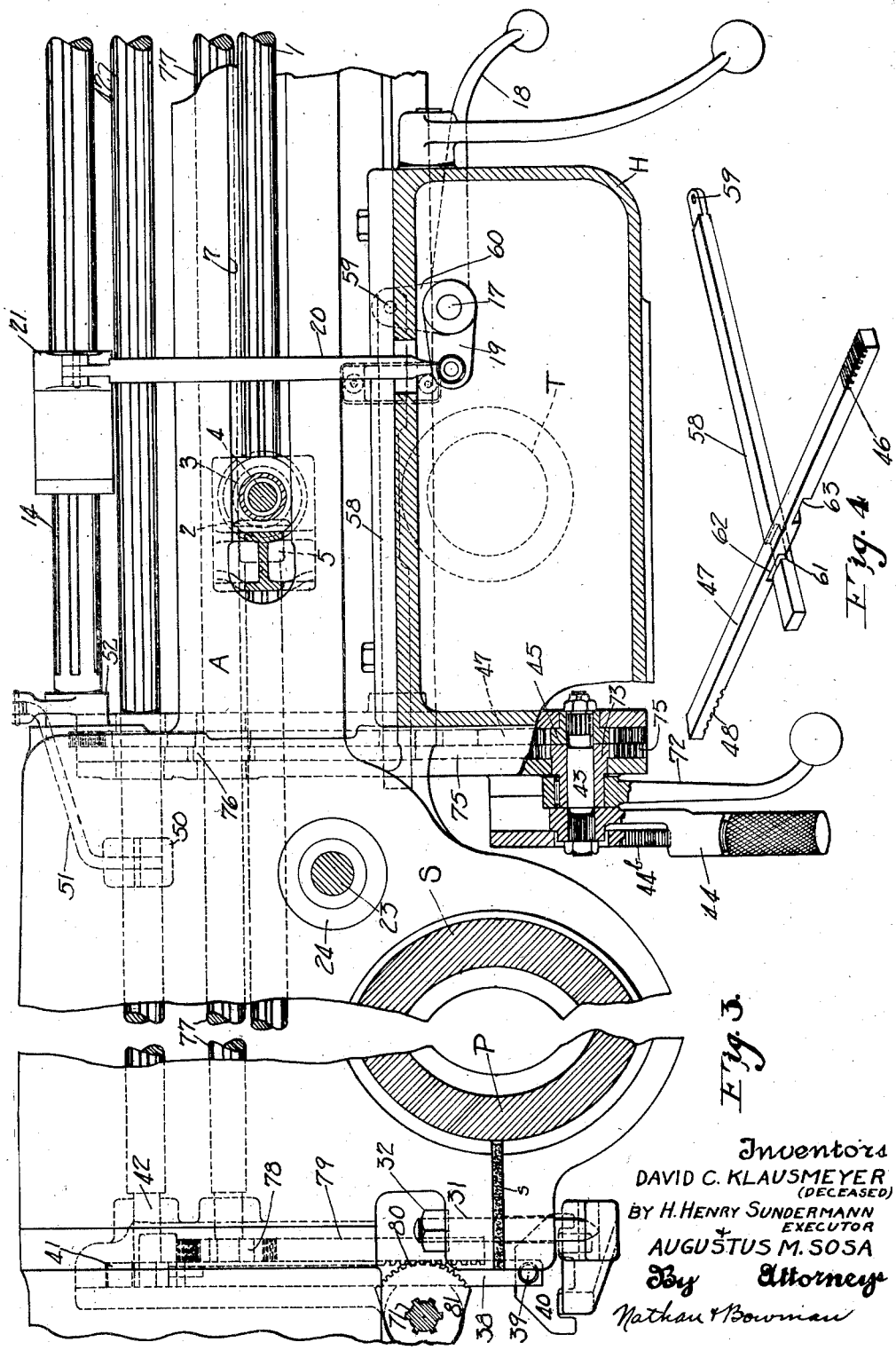

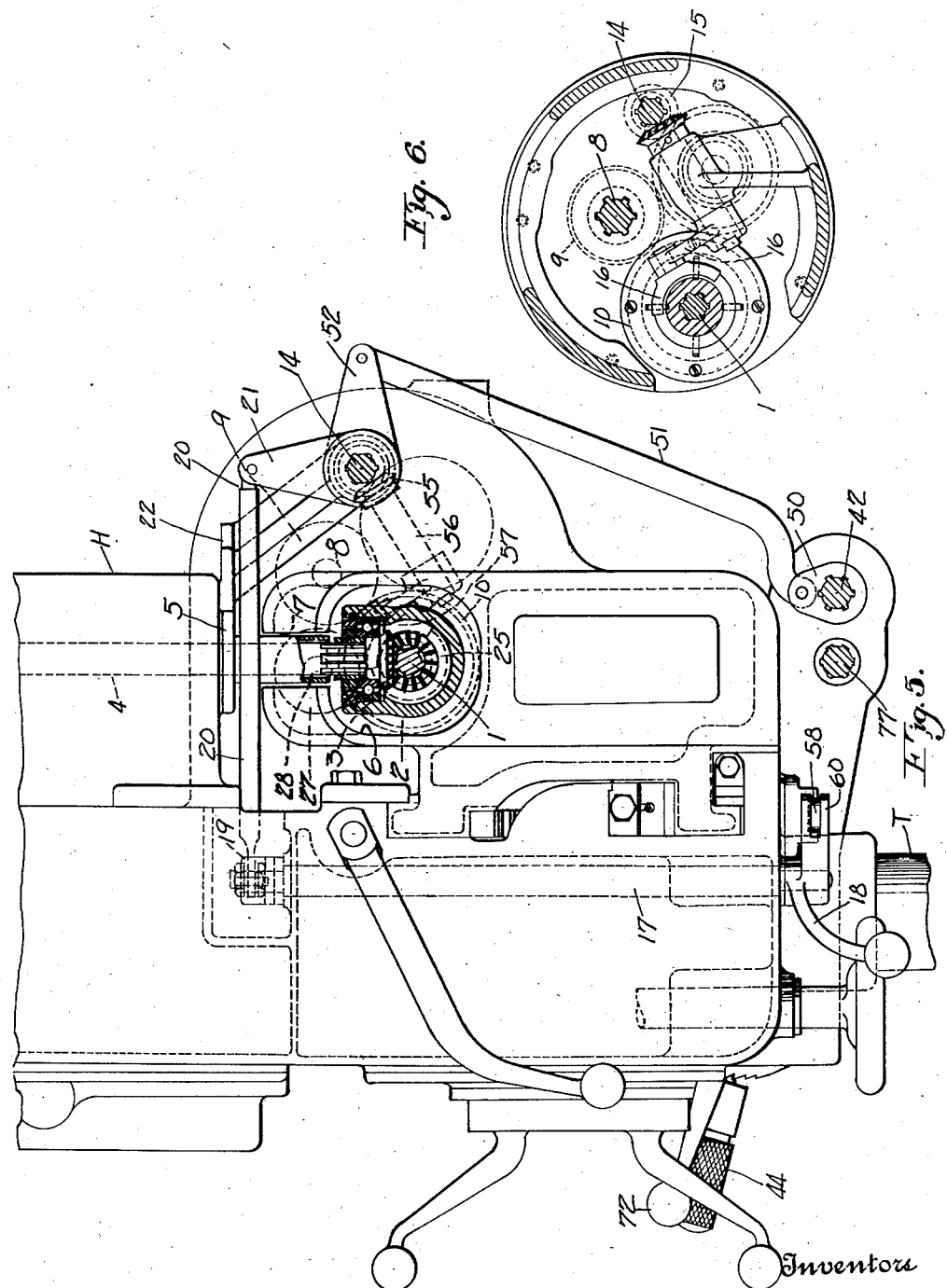

Feb. 27, 1934.   D. C. KLAUSMEYER ET AL   1,948,618
INTERLOCKED ARM CLAMP AND ELEVATING CONTROL
Filed April 4, 1930   6 Sheets-Sheet 5
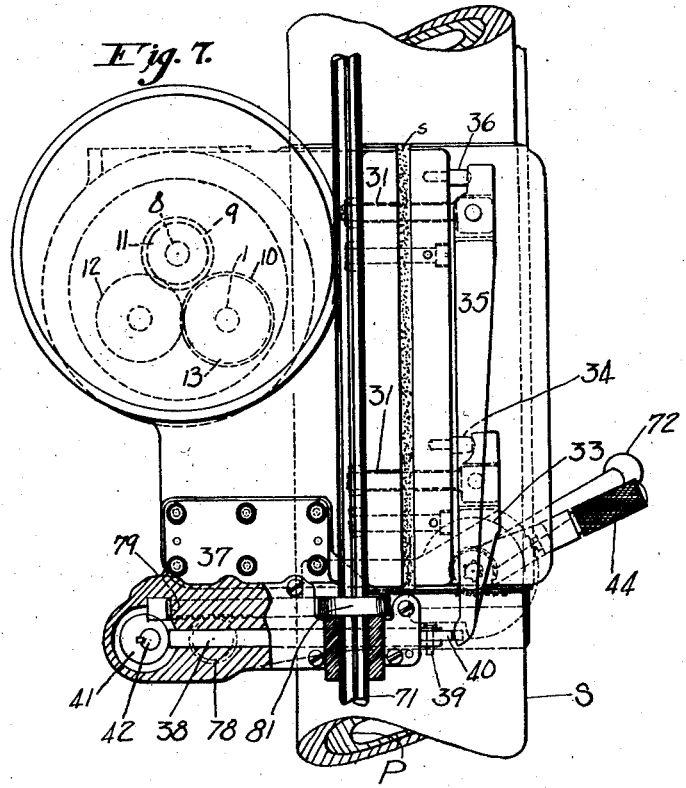
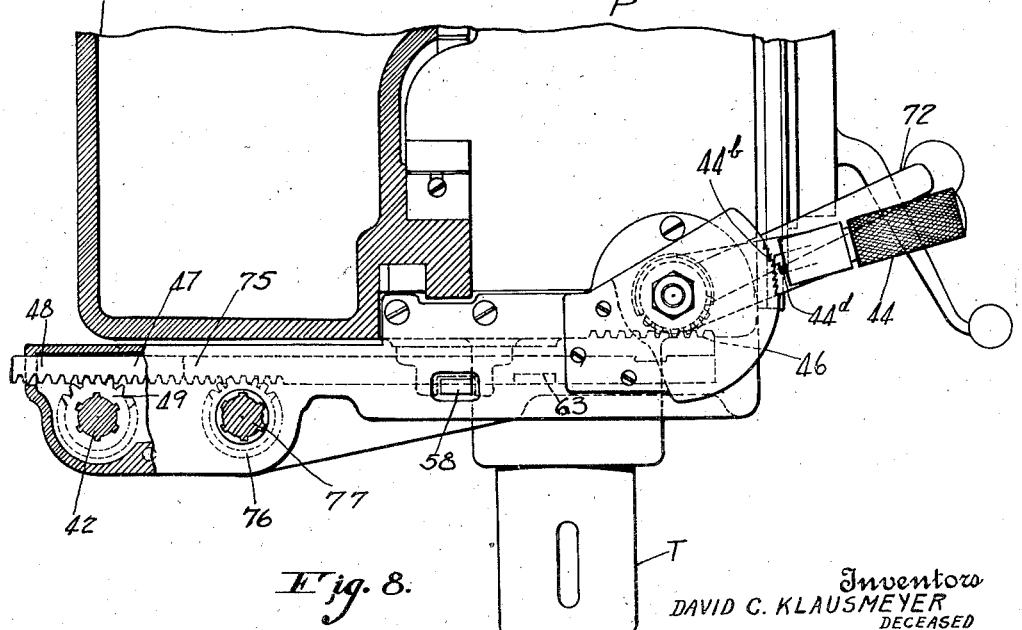
Inventors
DAVID C. KLAUSMEYER
DECEASED
BY
Attorneys H. HENRY SUNDERMANN
EXECUTOR
Nathan Bowman   AUGUSTUS M. SOSA

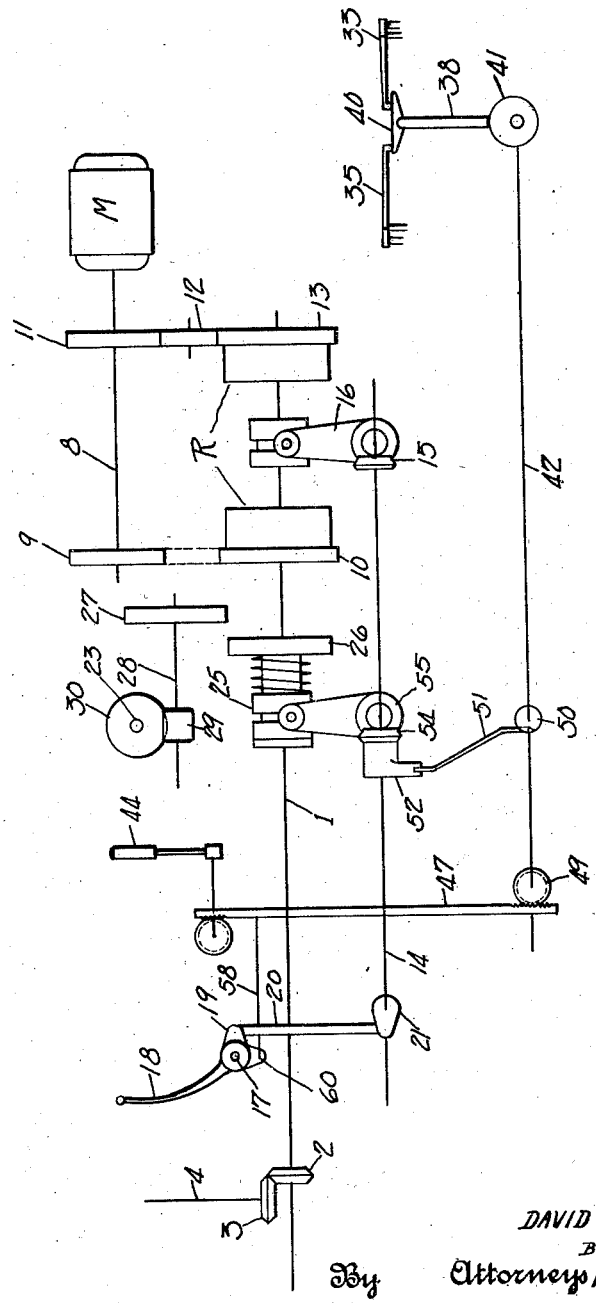

Patented Feb. 27, 1934

1,948,618

UNITED STATES PATENT OFFICE

1,948,618

INTERLOCKED ARM CLAMP AND ELEVATING CONTROL

David C. Klausmeyer, deceased, late of Cincinnati, Ohio, by H. Henry Sundermann, executor, and Augustus M. Sosa, Cincinnati, Ohio, assignors to The Cincinnati Bickford Tool Company, Cincinnati, Ohio, a corporation of Ohio Application April 4, 1930. Serial No. 441,490

9 Claims. (Cl. 77—28)

This invention deals with machine tools and it relates more particularly to radial drilling machines.

A primary object of the invention is to facilitate the vertical adjustment of the drill arm on the usual vertical column, to facilitate the clamping and unclamping of the arm to the column, and to provide means, whereby said operations may be performed only under certain conditions and in a predetermined order.

Another object of this invention is to provide an improved clamping mechanism for a radial drill arm whereby an operator may actuate said mechanism with materially less effort than heretofore has been possible and while in his normal working position at the machine head.

In the operation of radial drills as heretofore constructed, an operator would sometimes adjust the arm on the sleeve and then, either inadvertently or carelessly, drill a hole in a work-piece without first securely clamping the arm to its supporting sleeve. This has resulted in imperfect work, and, in some instances, in breakage thereof or breakage of the drill. This invention has for another of its objects so to construct and arrange the arm clamp mechanism and the power controlling means that the operator may not operate the machine until he has first securely clamped the arm to its supporting column.

Another object of the invention is to provide improved means to prevent connecting the power means to move the arm until the arm clamp has first been released to free the arm from the sleeve.

These and other objects have been attained by the provision of an improved arm clamping mechanism operable from a lever mounted on, and movable with, the translatable drill head, said clamping mechanism affording unequal leverages for actuating portions required to be actuated in opposition to unequal loads, said leverages being proportional to the work required to be done thereby. An improved interlock between the arm clamping mechanism and the control for the power means which serves to move the arm vertically and to rotate the drill spindle insures that the power means may not be rendered effective to move the arm unless the arm clamp is released. Means also is provided for insuring that the gears which effect translation of the arm will be completely meshed before power is applied thereto, thereby precluding the clashing of gear teeth and breaking thereof incident, in prior constructions, to transmission of power with gear teeth only partly meshed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
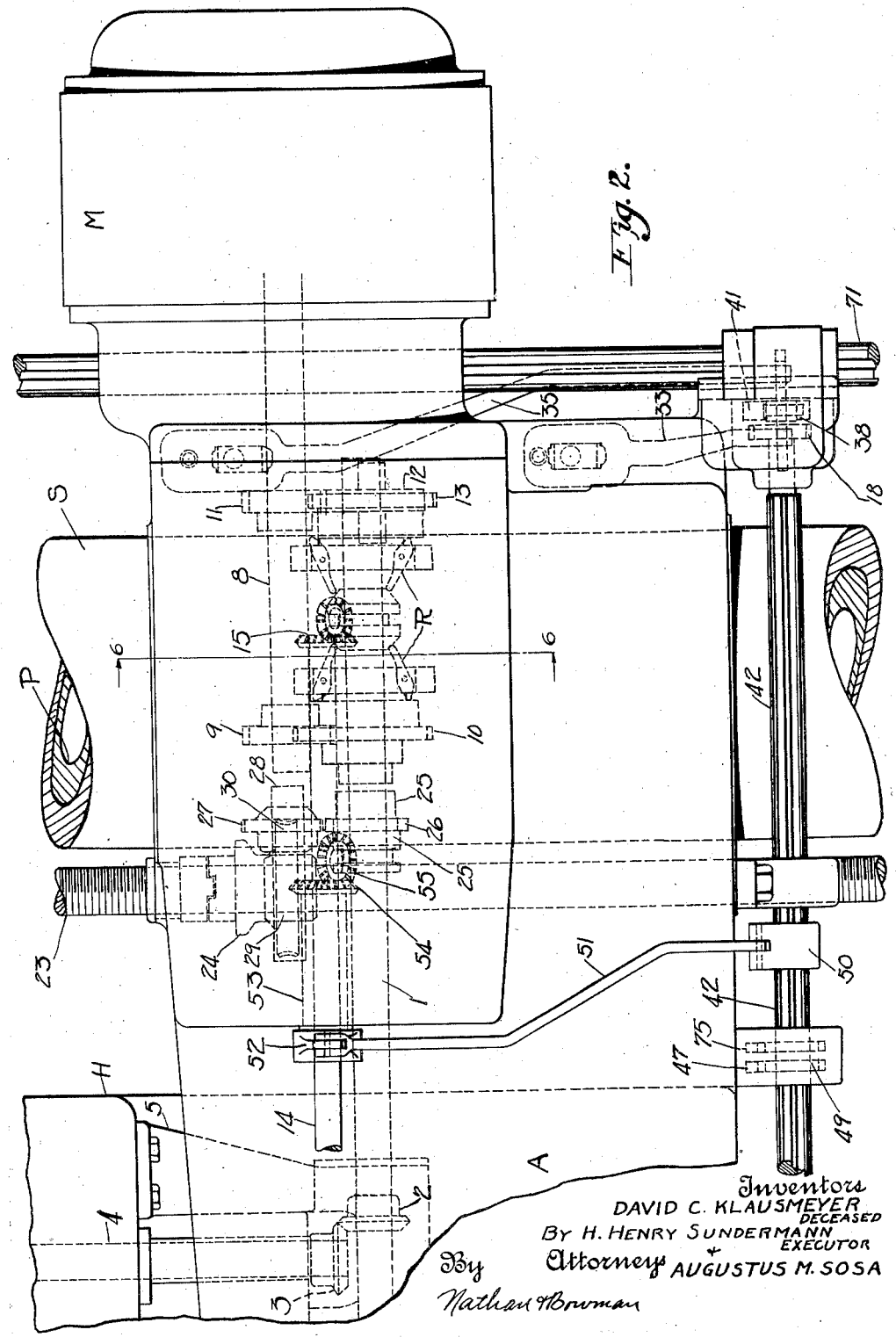

Figure 1 is a front elevation of a radial drilling machine embodying the present invention. Fig. 2 is an enlarged rear view of a portion of the column and a portion of the radial arm mounted thereon, showing also the driving motor secured to the arm, and certain mechanism later to be described. Fig. 3 is a plan view of a portion of the radial arm and parts connected therewith, illustrating particularly the arm-clamping and power controlling means with an interlock therebetween, parts of the column and drill head being shown in section. Fig. 4 is a detail perspective view of two of the interlock elements, later to be referred to. Fig. 5 is a right end view of the radial arm and a portion of the drill head shown in Fig. 1, certain shafts being shown in section, better to illustrate the invention. Fig. 6 is a section substantially on the line 6—6 of Fig. 2. Fig. 7 is a left end view, partly in section, of a portion of Fig. 1 showing more particularly the arm clamping mechanism. Fig. 8 is a detail section substantially on the line 8—8 of Fig. 1 showing portions of the arm and column clamping mechanisms. Fig. 9 is a diagrammatic view illustration of the arm clamp actuating mechanism; the arm elevating mechanism; the power control mechanism and the safety interlock between the clamp and power controls.

Referring more particularly to the drawings the invention is disclosed as embodied in a radial drilling machine comprising a base B, an upright column C, consisting of a post P and a sleeve S rotatably journaled on said post and an arm A extending radially from the column and supporting the usual tool-head H, translatably mounted thereon. A tool spindle T is rotatably and translatably journaled in the tool-head and receives rotary motion from a power driven shaft 1, journaled lengthwise of the arm. Inasmuch as the specific means for translating the tool-head on the arm and for rotating and translating the tool spindle from the arm shaft 1, form no part of this invention, detailed illustration and description thereof is deemed unnecessary. Suffice it to say that, as shown in Figs. 2, 3 and 5, a bevel gear 2 is splined to the arm shaft and meshes with a similar gear 3, fixed upon a shaft 4, which extends into the drill head and from which, through suitable mechanism, the spindle is rotated and translated. The gear 2 is translatable lengthwise of the arm with the tool head, being carried therewith by bracket 5, fixed to the underside of a portion of the tool head. The arm shaft is housed within a chamber 6 formed within the arm, connection therewith being made through an opening 7 formed in the upper wall of the arm, through which opening the bracket 5 and shaft 4 extend.

Power to rotate the arm shaft and for moving the arm vertically on the column is provided by a motor M mounted on the arm adjacent the column. The motor shaft 8 may be connected with the arm shaft 1 through either of two gear trains, one comprising a gear 9 which meshes with a gear 10 rotatably journaled about the arm shaft, and the other comprising a gear 11 which drives an intermediate gear 12 meshing with a gear 13, journaled about the shaft 1 similarly to gear 10. These gear trains may be rendered effective selectively to rotate the arm shaft in either forward or reverse directions by a reversing clutch, designated generally as R. Means is provided whereby the operator may actuate the reversing clutch when stationed in his normal working position, i. e. in front of the drill tool-head. This means includes a spline shaft 14, journaled lengthwise of the arm, which, through a bevel gear set 15, actuates a clutch shifter 16. Fixed upon one end of a shaft 17, journaled in the tool-head is a power control lever 18. An arm 19, fixed to the other end of the shaft, connects by link 20 with a rock arm 21 splined to the shaft 14. The rock arm 21 is moved lengthwise of the arm with the tool-head by any suitable means, such e. g. as the bracket 22 shown in Fig. 5. From the foregoing it will be perceived that by manipulation of the control lever 18 the reversing clutch R may be actuated to render effective either the forward or reverse drive from the motor shaft to the arm shaft.

Vertical movement of the arm on the column is effected by means of a screw 23 supported lengthwise of the column and a cooperating nut 24 mounted in the arm and threaded on said screw. Preferably the screw 23 will be normally stationary and movement of the arm will be effected by rotating the nut on the screw. Power to rotate the elevating nut 24 is taken from the arm shaft 1 as will now be described. A gear unit 25 is splined upon the shaft 1 and affords a gear 26 adapted to be meshed with a gear 27 fixed upon a short shaft 28 journaled in the arm. A worm 29 fixed upon the shaft 28 drives a worm wheel 30 fixed to the elevating nut 24. Thus, when the gears 26 and 27 are in mesh, the nut 24 may be rotated to raise or lower the radial arm, the direction of movement of the arm being dependent upon whether the forward or reverse drive from the shaft 8 to the arm shaft is effective. The gears 26 and 27 are normally disconnected and are meshed only when the arm clamp is released, as later will be explained.

This invention provides an improved means for clamping the arm to the column. As shown in Figs. 3 and 7 that portion of the arm surrounding the sleeve S is split, as indicated at s, and this split portion may be contracted to cause that portion of the arm securely to grip the sleeve. It will readily be perceived that, due to the weight of the arm and the drill head thereon, when the clamps are open, the outer end of the arm will tend to swing downwardly as indicated by the arrow $x$ in Fig. 1, thus causing the arm tightly to bind upon the column at the points $a$ and $b$ and to produce a certain amount of slack at the points $c$ and $d$. To again clamp the arm securely to the column it is necessary that a substantially greater force be applied at the upper portion of the arm than at the lower portion thereof. This is due to the fact that to securely clamp the lower portion it is necessary only to contract the strain-free split portion of the arm whereas, in order to contract the upper split portion of the arm it is necessary slightly to lift the outer end of the arm thereby to take up the slack at the point $c$ before the upper portion of the arm can be contracted. This invention provides individual means for contracting the upper and lower portions of the split arm. Each of these means comprises a draw bolt 31, having a nut 32 engaging one of the walls of said split portion. A relatively short lever 33 fulcrumed on a pin 34 is pivoted to the lower bolt and affords means for contracting the lower end of the arm. The upper clamp comprises a relatively longer lever 35, fulcrumed at 36 and pivoted to the upper draw bolt. The length of the levers 33 and 35 are substantially proportional to the amount of force required to contract the upper and lower portions of the split arm to securely clamp it to the column. Slidingly mounted in a portion of the arm and preferably in a bracket 37, removably secured to the arm, is a bar 38 to which is pivoted at 39 a cross-head 40 engaging the depending ends of the levers 33 and 35. This pivoted head comprises an equalizing device whereby, upon endwise movement of the rod 38, the upper and lower clamps will be set equally. A clamp actuating cam or eccentric 41 is fixed upon one end of an arm clamp shaft 42, journaled lengthwise of the drill arm. Fixed to one end of a short shaft 43, carried by the drill head, is a clamp actuating lever 44. A pinion 45 is secured to the other end of the shaft and meshes with rack teeth 46, formed on one end of a bar 47 slidingly mounted on the drill head transversely of the arm shaft. The other end of the bar 47 is provided with rack teeth 48 which engage a pinion 49 splined upon the arm clamp shaft. Splined to the shaft 42 is an arm 50 connected by a link 51 to an arm 52 projecting from one end of a sleeve 53, rotatably journaled about the shaft 14. The sleeve 53 carries a bevel gear 54 which meshes with a similar gear 55 fixed upon one end of a shaft 56. To the other end of the shaft 56 is secured a yoke 57 which engages the shiftable gear unit 25 hereinbefore referred to. This mechanism is so constructed and arranged that whenever the lever 44 is shifted to open the arm clamp the gear 26 will be shifted into mesh with the gear 27 and similarly when the lever 44 is shifted to close the clamp the gear 26 will be shifted out of mesh with the gear 27. Thus it will be seen that it will be impossible to effect a power drive to the elevating nut 24 except when the arm clamp is released. A spring pawl 44ª carried by the lever 44 is adapted to engage ratchet teeth formed on a fixed segment plate 44ᵇ to prevent accidental movement of the lever 44. The pawl may be disengaged from the ratchet teeth by axial movement of the knurled portion of the lever 44.

To insure that the gears 26 and 27 will be completely meshed before power is applied thereto, to effect movement of the arm, safety means is provided for insuring that the reversing clutch R will be shifted to neutral before the arm elevating and clamp controlling lever 44 may be actuated. This safety means comprises an interlock between the power control lever 18 and the lever 44 and consists of a slide bar 58 slidingly mounted in the tool head transversely of the slide bar 47, said bars being so positioned that each intersects the plane of the other. The bar 58 is pivoted at 59 to an arm 60 secured to the shaft 17. A notch 61, formed in the bar 58, permits endwise movement of the bar 47 only when the lever 18 is in such position that the reversing clutch R is in neutral position. The slide bar 47 is formed with similar notches 62 and 63 which permit movement of the slide bar 58, and consequently movement of the lever 18, only when the arm clamp is completely closed or completely opened.

From the foregoing it will be understood that to change the elevation of the arm on the column it is necessary first to shift the power control lever 18 to an intermediate position in which position the reversing clutch is rendered neutral and power from the motor shaft 8 to the arm shaft 1 is discontinued. Next the lever 44 may be swung to release the arm clamp and simultaneously engage the arm translating gears 26 and 27. This having been done, the lever 18 may be shifted to actuate the reversing clutch R to render effective either a forward or reverse drive to the arm shaft and consequently to the elevating nut 24. To discontinue the vertical movement of the arm, the lever 18 is again swung to its intermediate position or to the position in which the reversing clutch is rendered neutral. The gears 26 and 27 are still in mesh and therefore should the operator again shift the lever 18 to effect a drive to the arm shaft for the purpose of drilling, the arm would again be moved vertically on the column thereby preventing the operator from using the machine for drilling until the lever 44 has been actuated to clamp the arm on the column which simultaneously disconnects the gears 26 and 27. As a further safeguard the connection between the arm shaft and the tool spindle is such that during rotation of the arm shaft in the direction to effect downward movement of the arm the tool spindle is rotated reversely. Thus the drill could not penetrate the work even if it should come in contact with it during the downward movement of the arm. To prevent damage to the machine and to the work, should either the tool or the arm engage the work during the downward movement of the arm, or should the arm reach the end of its travel on the column, a safety device F is embodied in the arm translating mechanism whereby same will be rendered ineffective when subjected to a predetermined strain.

Means also is provided for clamping the sleeve to the post. This means comprises a two-part clamp ring 70 formed with an internal V-shaped groove adapted to engage conversely flaring conical shoulders provided by the sleeve and post. Contraction of the clamp ring 70 is effected through suitable means by rotation of a shaft 71 journaled lengthwise of the sleeve. This shaft is adapted to be rotated by the operator when standing in his normal working position at the drill head. To that end a column clamp lever 72 is mounted on the drill head adjacent the lever 44. The lever 72 is fixed to sleeve 73 journaled on the shaft 43 which sleeve affords a pinion 74 engaging teeth formed on one end of a rack-bar 75 slidingly mounted in the head adjacent the slide bar 47 previously referred to. The other end of the rack-bar 75 is formed with rack teeth which mesh with a pinion 76 splined upon a column clamp shaft 77 journaled lengthwise of the arm A. A pinion 78 fixed upon the rear end of the shaft 77 engages rack teeth formed on one end of a rack bar 79 which also affords teeth 80 engaging the teeth of a segment 81 splined to the shaft 71. Thus manipulation of the hand lever 72 carried by the drill head will actuate the column clamp.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A radial drilling machine combining a column; an arm translatably mounted thereon; means to clamp said arm to said column; a drill head translatably mounted on said arm; a tool spindle rotatably journaled in said drill head; power means including a prime mover on the arm, a shaft extending lengthwise of the arm and a reverser between said prime mover and said shaft for rotating said spindle and effecting translation of said arm; a lever mounted on said drill head for actuating said arm clamping means and rendering said power means effective for translating said arm; a lever mounted on said drill head for controlling said reverser; and an interlock mechanism between said levers to prevent movement of said clamp actuating and arm translating control lever except when said reverser control lever is in a position to render said power means ineffective.

2. A radial drilling machine combining a column; an arm translatably mounted thereon; power means, including a prime mover on said arm, a shaft extending lengthwise of the arm, a reversing clutch between the prime mover and said shaft and a train of gears actuated from said shaft, for moving said arm on said column; a drill head translatably mounted on said arm; mechanism, including an actuating lever carried by said drill head, to clamp said arm to said column and to shift one of said gears into and out of mesh with another gear of said gear train thereby to make said train effective or ineffective; means including a lever carried by said drill head for controlling said reversing clutch; and an interlock mechanism carried by said head and interposed between said levers to prevent opening of said clamp and shifting of said gear until said power means has been rendered ineffective.

3. A radial drilling machine combining a column; an arm translatably mounted thereon; means to clamp said arm to said column; a drillhead translatably mounted on said arm; a power driven shaft journaled lengthwise of said arm; a tool spindle rotatably journaled in said head and driven from said shaft; a prime mover; a power transmission including a clutch, having operative and neutral positions, connecting said prime mover with said shaft; a second shaft journaled lengthwise of said arm and adapted to actuate said clutch; a power control lever mounted on said drill-head for actuating said second shaft; a third shaft journaled lengthwise of said arm and connected to actuate said arm clamp; a second lever mounted on said drill-head for actuating said third shaft; and an interlock mechanism between the clamp-actuating means and the clutch-actuating means to prevent release of the clamp until the clutch has been actuated to discontinue the drive to said first shaft.

4. A radial drilling machine combining a column; an arm translatably mounted thereon; means including a slide-bar carried by said head to clamp said arm to said column; a drill-head translatably mounted on said arm; a tool spindle rotatably journaled in said drill-head; power means for rotating said spindle; a lever mounted on said drill-head and connected with said slide-bar for actuating said arm clamping means; a second lever mounted on said head for rendering said power means effective and ineffective; and an interlock mechanism comprising a second slide-bar actuated by said second lever and movable transversely of the first named slide-bar and intersecting the plane thereof; each of said slide-bars being provided with a notch to permit passage of the other slide bar therethrough, said interlock mechanism serving to prevent actuation of said clamping means except when said second lever is in a position to render said power means ineffective.

5. A radial drilling machine combining a column; an arm translatably mounted thereon; means to clamp said arm to said column; a drill-head translatably mounted on said arm; a power driven shaft journaled lengthwise of said arm; means actuated by said shaft for moving said arm vertically on said column; a prime mover; a power transmission, including a clutch, connecting said shaft with said prime mover; a second shaft journaled lengthwise of said arm and connected to actuate said clutch; a third shaft journaled lengthwise of said arm and connected to actuate said arm clamp; a clamp actuating hand lever fulcrumed on said head; a slide-bar carried by said head and actuated by said hand lever; an operative connection between said slide-bar and said third shaft; a second lever fulcrumed on said head; a rock arm splined to said second shaft and movable with said drill head; an operative connection between said second lever and said rock-arm, whereby movement of said second lever actuates said clutch; and an interlock between said second lever and said slide-bar to prevent actuation of the first named hand lever except when said second lever is in a predetermined position.

6. In a radial drilling machine, a column; an arm mounted on said column; a tool-head translatably mounted on said arm; means to clamp said arm to said column, said means including a pair of clamp levers arranged side by side and substantially parallel, the length of one of said levers being greater than the width of said arm and each of said levers having its free end extending below said arm; a slide rod supported by said arm and connected to actuate said levers, a shaft journaled lengthwise of said arm; a cam on said shaft engaging said slide rod to cause it to actuate said clamp levers; a pinion splined to said shaft and movable with said tool-head, a rack-bar slidably mounted in said tool-head and engaging said pinion, and a clamp-actuating lever mounted on said tool-head and operatively connected with said rack-bar to actuate said arm clamp.

7. In a radial drilling machine, a column; an arm translatably mounted thereon; a tool head translatably mounted on said arm; means to clamp said arm to said column; a power driven shaft extending lengthwise of said arm; power means including a fixed gear and a gear splined on said power shaft and adapted to be shifted into engagement with said fixed gear to effect translation of said arm on said column; a prime mover; a transmission including a reversing clutch between said prime mover and said arm shaft; means including a first lever mounted on the tool head and a first slide bar, having a plurality of spaced notches, shifted by said lever to actuate said arm clamp and to shift said splined gear into engagement with said fixed gear; means including a second lever mounted on the tool head for actuating said reversing clutch; a second slide bar actuated by the last named lever and arranged in the plane of the first slide bar and provided with a notch for the passage of the first slide bar the second slide bar being adapted to pass through the notches of the first slide bar, said slide bars and the notches therein comprising an interlock between said levers which prevents actuation of the first lever except when the reversing clutch is in its neutral position and prevents actuation of the second lever except when the clamps are fully opened or fully closed and the arm translating gears are fully meshed or fully unmeshed.

8. A radial drill combining a column; an arm translatably mounted thereon; a tool head on said arm; a spindle in said tool head; a power driven transmission; a spindle-driving transmission; a first means for connecting said transmissions; an arm translating transmission; a second means for connecting said arm translating transmission with the spindle-driving transmission; and an interlock between said two means arranged to prevent said arm translating mechanism from being connected with the spindle-driving transmission until after the latter has been disconnected from the power driven transmission.

9. A radial drill combining a column; an arm translatably mounted thereon; a power transmission; a spindle-driving transmission; a motion reverser and clutch interposed between said power transmission and said spindle-driving transmission for selectively rotating the latter in either of two directions; means to actuate said reverser and clutch; arm translating means; a power transmission for said arm translating means including a shiftable drive gear connected to said spindle-driving transmission intermediate said motion reverser and the spindle; means for shifting said drive gear thereby to render effective the power transmission for the arm translating means; and an interlock between said gear shifting means and said reverser actuating means to prevent said gear from being shifted during rotation of said spindle-driving transmission.

H. HENRY SUNDERMANN,
*Executor of the Last Will and Testament of David C. Klausmeyer, Deceased.*
AUGUSTUS M. SOSA.